US009426973B2

(12) United States Patent
Schertz

(10) Patent No.: US 9,426,973 B2
(45) Date of Patent: Aug. 30, 2016

(54) SPRAYING SYSTEM AND METHOD

(71) Applicant: Schertz Aerial Service, Inc., Hudson, IL (US)

(72) Inventor: Scott Schertz, Hudson, IL (US)

(73) Assignee: Schertz Aerial Service, Inc., Hudson, IL (US)

( * ) Notice: Subject to any disclaimer, the term of this patent is extended or adjusted under 35 U.S.C. 154(b) by 0 days.

(21) Appl. No.: 14/670,714

(22) Filed: Mar. 27, 2015

(65) Prior Publication Data

US 2015/0272106 A1    Oct. 1, 2015

Related U.S. Application Data

(60) Provisional application No. 61/972,019, filed on Mar. 28, 2014.

(51) Int. Cl.

| B05B 1/24 | (2006.01) |
| A01M 7/00 | (2006.01) |
| B05B 12/00 | (2006.01) |
| B05B 1/20 | (2006.01) |
| B05B 12/10 | (2006.01) |

(52) U.S. Cl.
CPC ......... *A01M 7/0089* (2013.01); *A01M 7/0042* (2013.01); *B05B 1/20* (2013.01); *B05B 1/24* (2013.01); *B05B 12/008* (2013.01); *B05B 12/10* (2013.01)

(58) Field of Classification Search
CPC ... A01M 7/0089; A01M 7/0042; B05B 1/30; B05B 12/008; B05B 7/168
USPC ........................................ 239/172, 128, 159
See application file for complete search history.

(56) References Cited

U.S. PATENT DOCUMENTS

| 2,052,626 | A | | 9/1936 | Houghton, Jr. |
| 3,455,511 | A | | 7/1969 | Fedorenko |
| 5,064,123 | A | | 11/1991 | Aiello et al. |
| 5,653,389 | A | | 8/1997 | Henderson et al. |
| 5,704,767 | A | | 1/1998 | Johnson |
| 5,810,248 | A | | 9/1998 | Vielberth |
| 5,967,066 | A | * | 10/1999 | Giles .................... A01C 23/024 111/119 |
| 6,036,103 | A | | 3/2000 | Benest |
| 6,269,757 | B1 | * | 8/2001 | Kiest .................... A01C 23/024 111/119 |
| 6,449,970 | B1 | | 9/2002 | Gagliano |
| 8,523,085 | B2 | | 9/2013 | Grimm et al. |
| 2004/0256490 | A1 | | 12/2004 | Sweeton |

(Continued)

OTHER PUBLICATIONS

Cordell, Susan and Paul B. Baker, "Pesticide Drift," The University of Arizona, College of Agriculture Cooperative Extension, publication No. AZ1050 (Sep. 1998).

(Continued)

*Primary Examiner* — Jason Boeckmann
(74) *Attorney, Agent, or Firm* — Leydig, Voit & Mayer, Ltd.

(57) ABSTRACT

A method for reducing drift of sprayed droplets includes storing a fluid to be sprayed in a reservoir carried by a vehicle, and providing a metered flow of the first fluid to a spray nozzle, from where the fluid is injected into an atmosphere as sprayed droplets. A drift of the sprayed droplets is reduced by causing the sprayed droplets to absorb moisture from the atmosphere after they are sprayed from the spray nozzle, such that a mass of each of the sprayed droplets increases sufficiently to reduce a drift of the respective sprayed droplet in the wind.

5 Claims, 3 Drawing Sheets

(56) References Cited

U.S. PATENT DOCUMENTS

2007/0298970 A1 12/2007 Mann et al.
2010/0113275 A1 5/2010 Qin et al.
2013/0079228 A1 3/2013 Freed
2013/0160357 A1 6/2013 Luciano, Jr.

OTHER PUBLICATIONS

Fishel, F.M. and J.A. Ferrell, "Managing Pesticide Drift," University of Florida, IFAS Extension, publication No. PI232 (Sep. 2010).

* cited by examiner

```
                    ┌─────────┐
                    │  START  │
                    └────┬────┘
                         ▼
    ┌─────────────────────────────────────────────┐
    │ STORE FIRST FLUID TO BE SPRAYED IN RESERVOIR│
    │              CARRIED BY VEHICLE             │──302
    └──────────────────────┬──────────────────────┘
                           ▼
    ┌─────────────────────────────────────────────┐
    │ PROVIDE METERED FLOW OF FIRST FLUID TO SPRAY│
    │                   NOZZLE                    │──304
    └──────────────────────┬──────────────────────┘
                           ▼
    ┌─────────────────────────────────────────────┐
    │ INJECT FIRST FLUID INTO ATMOSPHERE AS SPRAYED│
    │                  DROPLETS                   │──306
    └──────────────────────┬──────────────────────┘
                           ▼
    ┌─────────────────────────────────────────────┐
    │ REDUCE DRIFT OF SPRAYED DROPLETS BY CAUSING │
    │ SPRAYED DROPLETS TO ABSORB MOISTURE FROM    │
    │                  ATMOSPHERE                 │──308
    └──────────────────────┬──────────────────────┘
                           ▼
    ┌─────────────────────────────────────────────┐
    │ SUFFICIENTLY INCREASE MASS OF SPRAYED        │
    │        DROPLETS TO REDUCE DRIFT             │──310
    └─────────────────────────────────────────────┘
```

FIG. 3

SPRAYING SYSTEM AND METHOD

CROSS REFERENCE TO RELATED APPLICATIONS

This patent application claims the benefit of the filing date of U.S. Provisional Patent Application Ser. No. 61/972,019, filed on Mar. 28, 2014, which is incorporated herein in its entirely by this reference.

TECHNICAL FIELD

This patent disclosure relates generally to spraying systems and, more particularly, to agricultural spraying systems including crop dusting systems and methods.

BACKGROUND

Use of aerial spraying, an operation also referred to as crop dusting, involves the aerial application of crop protection products onto an agricultural field by an aircraft. In addition to crop protection products, certain types of seed can also be sown by aerial applications. Land-based crop spraying operations typically use specialized vehicles. In either case, the air or land based vehicle includes a reservoir containing the material to be sprayed, which is pressurized and provided to one or more spray nozzles for distribution onto the ground.

When distributing crop protection products on a field, or in other applications, the amount of product that is deposited on the ground or on crops is customarily less than the amount of product provided through the sprayer(s) because a portion of the distributed product may drift and/or evaporate during deposition. More specifically, most distributed products such as pesticides, fertilizers and the like, are provided in liquid or granular form. These materials are distributed by spray nozzles that are arranged along a boom of an earth-moving agricultural implement or beneath the wings of an aerial deposition machine such as a fixed-wing airplane. Specifically regarding aerial deposition, agricultural aircraft are highly specialized, purpose-built aircraft that can carry as much as 800 gallons of crop protection product for depositions. Helicopters are sometimes also used. When depositing material on a crop during flight, the aircraft will typically try to fly low, for example, at a height of about 8 ft., while spraying the crop to try to minimize drift of the material deposited. Land-based spray systems may also include booms having spray nozzles arranged thereon at a distance from the ground. In either case, the sprayed material may drift and not reach its intended target. Drift, as is known, describes the drifting of sprayed particles due to wind and/or turbulence created by the aircraft or the wind away from the target, i.e. the crop, and into the wind or to adjacent areas of the field. As can be appreciated, drift can reduce the effectiveness of the crop spraying operation, can lead to detrimental effects due to over-spraying of areas where drift is deposited, or may deposit undesired products on adjacent crops, livestock grazing fields, populated areas and the like.

SUMMARY

The disclosure relates to the spraying of liquid or solid materials onto agricultural fields or other areas. The spraying methods contemplated may use aerial or ground delivery vehicles having sprayers associated therewith. The invention involves using a temperature differential between ambient air temperature and the liquid or other material to be sprayed to reduce drift of the liquid as it drops to the ground. Specifically, it is contemplated that the atomized liquid or granular solid particles exiting the sprayers will be cooler than the surrounding air, i.e., cooler than ambient temperature and, preferably, cooler than a prevalent dew point, such that the particles will absorb moisture from the surrounding air, thus becoming larger, with increased mass. The increased particle size and mass will result in more droplets reaching the ground, thus reducing air-time and drift.

To achieve droplets that are cooler than the surrounding air, various methods can be used. In one embodiment, liquid coolers can be used to cool the fluid before spraying, with the cooling occurring in a reservoir for holding the fluid or in conduits transferring the fluid to the spray nozzles. In another embodiment, the fluid may include compounds that chemically react with oxygen, light or moisture in an endothermic or hydrophilic reaction that will lower the temperature of the droplets after the liquid has been released from the sprayer to will otherwise cause moisture to collect on the sprayed material.

The innovation will have a larger beneficial effect at relatively high surrounding air temperatures and high relative humidity, which are common during spraying operations. Presently used methods for reducing drift include mixing polymers and other substances with the sprayed liquids.

Therefore, in one aspect, the disclosure describes a spray system associated with a vehicle configured to traverse a field. The spray system includes a reservoir adapted to contain therein a fluid to be sprayed, a pump associated with the reservoir and configured to selectively draw a flow of the fluid from the reservoir, a metering device disposed to control an amount of the flow of fluid, and at least one spray nozzle disposed to receive the amount of the flow of the fluid. A heat exchanger is disposed to alter a temperature of the amount of the flow of the fluid that is provided to the at least one spray nozzle. The heat exchanger operates to cool the flow of the fluid such that spray droplets of the fluid injected through the at least one spray nozzle into an atmosphere have a spray temperature at least temporarily after injection that is below a dew temperature of the atmosphere into which the spray droplets are injected.

In another aspect, the disclosure describes a spray system associated with a vehicle configured to traverse a field. The spray system includes a first reservoir adapted to contain therein a first fluid to be sprayed, a first pump associated with the first reservoir and configured to selectively draw a first flow of the first fluid from the first reservoir, and a first metering device disposed to control an amount of the first flow of the first fluid. The system further includes a second reservoir containing a second fluid, a second pump associated with the second reservoir and configured to selectively draw a second flow of the second fluid from the second reservoir, and a second metering device disposed to control an amount of the second flow of the second fluid. A mixer is disposed to receive the first flow of the first fluid and the second flow of the second fluid, mix the two flows into a third flow, and provide the third flow to at least one spray nozzle disposed to receive the third flow. A spray controller is associated with the first and second metering devices, and the at least one spray nozzle, and operates to control operation of the first and second metering devices such that the third flow provided to the at least one spray nozzle has a desired ratio of the first fluid to the second fluid.

In yet another aspect, the disclosure describes a method for reducing drift of sprayed droplets. The method includes storing a first fluid to be sprayed in a reservoir carried by a vehicle, providing a metered flow of the first fluid to a spray nozzle, injecting the first fluid into an atmosphere as sprayed droplets, and reducing a drift of the sprayed droplets by causing the sprayed droplets to absorb moisture from the atmosphere after they are sprayed from the spray nozzle, wherein a mass of each of the sprayed droplets increases sufficiently to reduce a drift of the respective sprayed droplet in the wind. In one embodiment, causing the sprayed droplets to absorb moisture from the atmosphere includes cooling the first fluid provided to the spray nozzle such that the sprayed droplets are colder than a dew temperature of the atmosphere into which the sprayed droplets are sprayed. In another embodiment, causing the sprayed droplets to absorb moisture from the atmosphere includes mixing the fluid provided to the spray nozzle with a second fluid, the second fluid endothermically reacting with one of the first fluid and the atmosphere such that a temperature of the fluid in the sprayed droplets falls below a dew temperature of the atmosphere into which the sprayed droplets are injected. In yet another embodiment, causing the sprayed droplets to absorb moisture from the atmosphere includes mixing the fluid provided to the spray nozzle with a second fluid, the second fluid hydrophilically interacting with the atmosphere such that moisture from the atmosphere into which the sprayed particles are injected is absorbed into the second fluid, which is in mixture with the first fluid.

BRIEF DESCRIPTION OF THE DRAWINGS

FIG. 3 is a flowchart for a method in accordance with the disclosure.

DETAILED DESCRIPTION

This disclosure relates to spraying systems and, more particularly, to a system for reducing drift of sprayed liquids by lowering the temperature of the liquid to be cooled below a dew point or dew temperature at the site that the liquid will be sprayed. As used herein, dew point or dew temperature refers to the temperature at which water vapor from the air at a constant barometric pressure condenses into liquid water at the same rate at which it evaporates. Thus, at temperatures below the dew point, water will leave the air and collect into the cooler liquid, in this case, droplets of the fluid or granules of the material being sprayed.

The contemplated cooling effect, which ultimately either mechanically or chemically causes condensation of ambient moisture onto sprayed droplets, may be accomplished by mechanical or chemical means. In the illustrated embodiments, certain principles are described in the context of an aircraft spraying system, but it should be appreciated that the systems and methods described herein have universal applicability to other delivery methods such as stationary sprayers and/or sprayers mounted onto land-traversing vehicles. Further, the spray applications are not limited to agricultural spraying applications. For example, the systems and methods in accordance with the disclosure can be implemented in ornamental, right-of-way, golf course, public health applications and the like, in addition to agricultural applications of materials sprayed to the ground.

Figure 1:
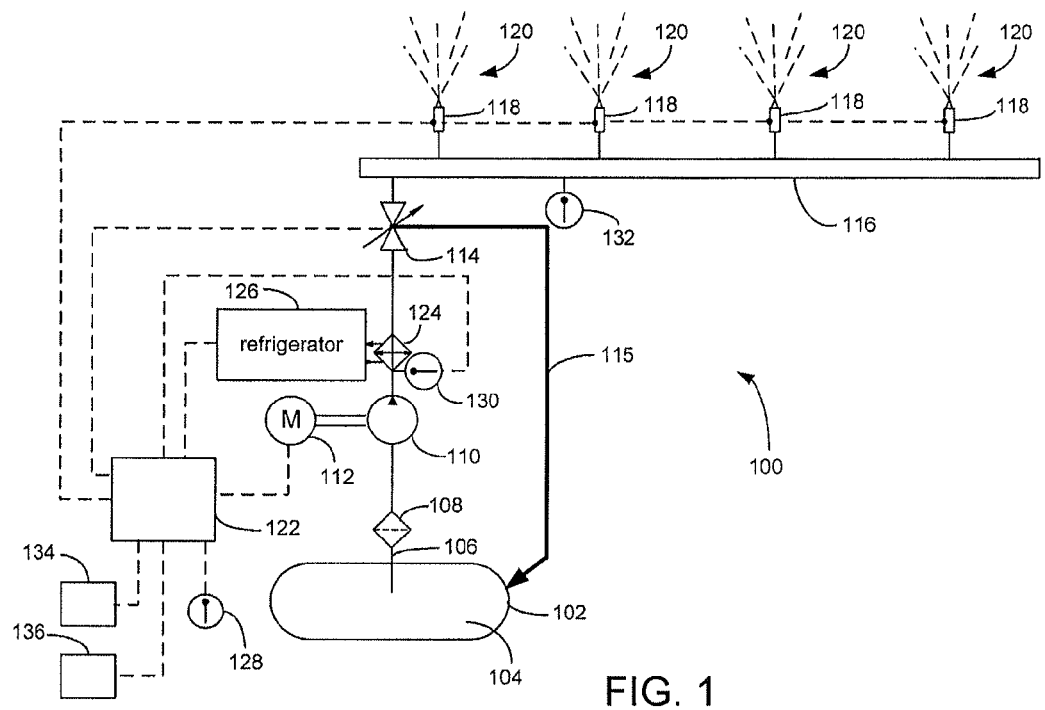
FIG. 1 is a block diagram for a spraying system in accordance with a mechanical embodiment of the present disclosure.

A first exemplary embodiment of a spray system 100 is shown in FIG. 1. The system 100 may be associated with an aerial spray aircraft, a self-propelled or towed land-based vehicle, a sea-going vessel, and other applications requiring the spraying of materials. The system 100 includes a reservoir 102 into which fluid 104 to be sprayed is contained. Fluid 104 is drawn from the reservoir 102 by a fluid draw line 106, which may further include an inline filter 108. Fluid from the fluid draw line 106 is provided to a pump 110, which in the illustrated embodiment is driven by an electric motor 112. The pump 110 operates to pressurize the fluid 104, which is provided via a metering device 114 such as a variable flow-area valve to a distribution manifold 116. In the illustrated embodiment, the metering device 114 is a metering valve that allows a selectively desired amount of fluid to be delivered downstream, and returns or shunts an unused amount of fluid to the reservoir 102 via a return line 115. A plurality of spray nozzles 118 is fluidly connected to the distribution manifold 116 such that a spray of fluid 104, which may be in the form of droplets, an aerosol solution, an emulsion of solid particles, and other forms of fluid distribution, is released as plumes 120.

In the illustrated embodiment, the spray nozzles 118 are electronically activated spray nozzles that are controlled in response to control signals provided by a spray controller 122. The spray controller is also connected to the metering device 114 and motor 112 operating the pump 110 such that all aspects of fluid delivery can be selectively monitored and controlled.

To control the temperature of the fluid 104 that is sprayed in the plumes 120, a heat exchanger 124 is used in-line along the path of fluid from the pump 110 to the manifold 116. As can be appreciated, the heat exchanger 124 can alternatively be used before the pump 110 and/or within the reservoir 102. In one contemplated embodiment, the heat exchanger 124 is associated with the spray manifold as part of the spray boom to adjust the temperature of only the fluid to be sprayed. Although not specifically shown in FIG. 1, additional temperature sensors before and/or after the heat exchanger may be used to inform the electronic controller of the function and effectiveness of the heat exchanger such the fluid to be sprayed is as close to a desired spray temperature as possible during operation. In the illustrated embodiment, the heat exchanger 124 is associated with a refrigeration unit 126 that circulates a refrigerant within the heat exchanger 124. The refrigerant is useful in reducing the temperature of the fluid 104 below ambient temperature and, preferably, at or below the dew temperature of surrounding air during the spray operation. Suitable refrigerants can include any known refrigerants including typical vapor or air cycle-type cooling systems. Further, direct drive, hydraulic, electrical or pneumatic means can be used to power a refrigeration system compressor (not shown for simplicity) that is part of the refrigeration unit 126.

In the embodiment shown, the refrigeration unit 126 is associated with and responsive to operating signals from the spray controller 122 such that its operation and, therefore, the cooling effect provided to the fluid 104, can be controlled. To control the temperature of the fluid 104, the spray controller 122 receives temperature information from various system sensors. As shown, an ambient temperature sensor 128 provides an ambient temperature signal to the controller 122 that is indicative of the ambient temperature. A supply temperature sensor 130 provides a supply temperature signal to the controller 122 indicative of the temperature of the fluid as it exits the reservoir 102. As can be appreciated, the ambient and supply temperatures may be close to one another and one can optionally used instead of the other. A delivery temperature sensor 132, which is shown associated with the manifold 116, provides a delivery temperature signal to the controller that is indicative of the cooled temperature of the fluid as it is sprayed form the nozzles 118.

During operation, the controller 122 may automatically calculate the dew temperature or may alternatively receive this information from a user of the system via an input device 134. The system may also provide information to the user via a display device 136. Thus, for a given spraying operation, the user, or the controller 122 automatically, e.g., by using an internet connection, may consult with weather information reports to determine the current dew temperature, and enter the same into the controller via the input device 134. The controller may use the dew temperature to set a desired spray fluid temperature that is lower than the dew temperature, for example, by a predetermined amount such as 5 degrees F., or a different temperature difference. After a target spray temperature has been established or otherwise automatically determined, the controller may monitor the supply and spray temperatures of fluid before and after the heat exchanger 124 to appropriately control the refrigeration unit 126 in a closed loop control fashion using the supply temperature as an input and the spray temperature as feedback. In one known control arrangement, for example, the error between the target and supply temperatures may be used in a PID-type controller, which can also include a feed-forward compensation based on the supply temperature.

Figure 2:
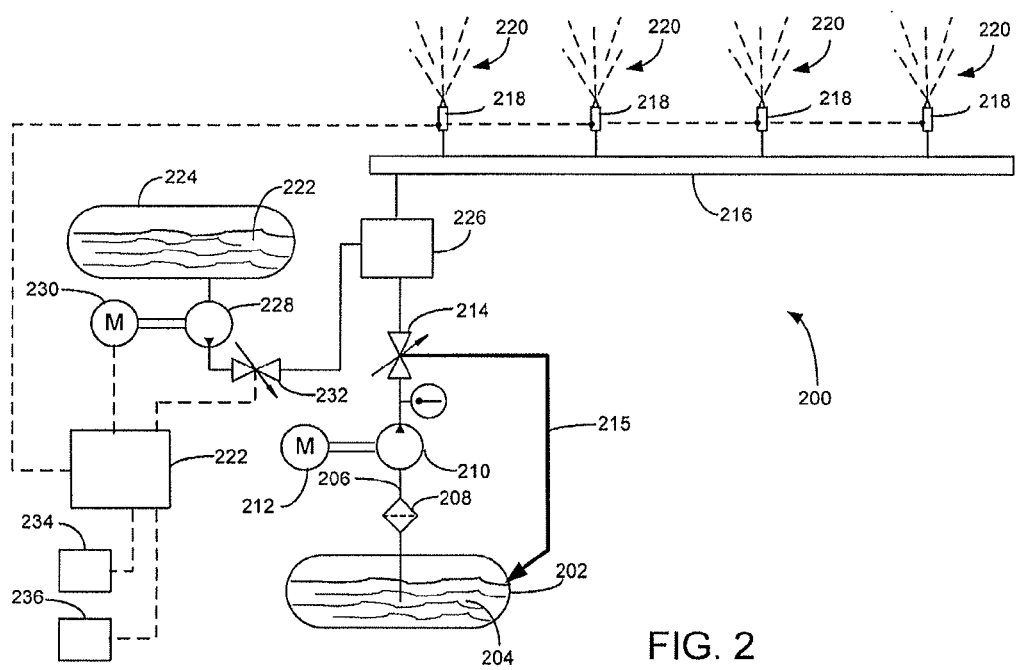
FIG. 2 is a block diagram for a spraying system in accordance with a chemically implemented embodiment of the present disclosure.

An alternative embodiment for a system 200 is shown in FIG. 2. In this embodiment, cooling of the spray plumes is accomplished by intermixing a chemical with the fluid that, when exposed to light, humidity and/or heat in the environment undergoes an endothermic or hydrophilic reaction that promotes condensation onto fluid droplets expelled by the sprayers. Like the system 100, the system 200 may be associated with an aerial spray aircraft, a self-propelled or towed land-based vehicle, a sea-going vessel, and other applications requiring the spraying of materials.

More specifically, the system 200 includes a reservoir 202 into which fluid 204 to be sprayed is contained. Fluid 204 is drawn from the reservoir 202 for use by a fluid draw line 206, which may further include an inline filter 208. Fluid from the fluid draw line 206 is provided to a pump 210, which in the illustrated embodiment is driven by an electric motor 212. The pump 210 operates to pressurize the fluid 204, which is provided via a metering device 214 such as a variable flow-area valve to a distribution manifold 216. In the illustrated embodiment, the metering device 214 is a metering valve that allows a selectively desired amount of fluid to be delivered to the distribution manifold 216, and returns or shunts an unused amount of fluid to the reservoir 202 via a return line 215. A plurality of spray nozzles 218 is fluidly connected to the distribution manifold 216 such that a spray of fluid 204, which may be in the form of droplets, an aerosol solution, and other forms of fluid distribution, is released as plumes 220.

In the illustrated embodiment, the spray nozzles 218 are electronically activated spray nozzles that are controlled in response to control signals provided by a spray controller 222. The spray controller is also connected to the metering device 214 and motor 212 operating the pump 210 such that all aspects of fluid delivery can be selectively monitored and controlled.

To control the temperature of the fluid 204 that is sprayed in the plumes 220, a chemical 222 stored in a secondary reservoir 224 is mixed with the fluid 204 at a mixer 226. Mixing of the chemical 222 can be accomplished in predetermined rates depending on the type of chemicals used as well as on the cooling or hydrophilic effect that is desired. Suitable chemicals to use in mixture with a sprayed fluid can include any endothermic or hydrophilic chemicals that will not substantially interfere with the potency or effectiveness of the sprayed fluid. Suitable mixing rates for those chemicals can be selected as appropriate depending on the type of fluid that is sprayed and the chemical used to create the endothermic and/or hydrophilic effects after the fluid has been sprayed. In the illustrated embodiment, the chemical 222 is drawn from the secondary reservoir by a mixing pump 228 that is operated by a mixing motor 230 that is responsive to commands from the spray controller 222. A mixing valve 232 meters the amount of chemical 222 that is mixed with the fluid 204 based on the amount of fluid provided through the pump 210 and also based on a desired mixing ratio. Information relative to the desired mixing ratio of fluid 204 with chemical 222 can be established in the controller 222 by a user entry made via an input device 234. Feedback on system status and other information can be provided to the user from the controller 222 via a display device 236. In one contemplated embodiment, the user may adjust various system parameters such as mixing ratio between the chemical 222 and the fluid 204 during a spray operation based on visual and other feedback on the effectiveness of the mixture to reduce drift of the plumes 220 after the fluid 204 has been sprayed.

As can be appreciated, the chemical 222 may be premixed with the fluid 204 in the reservoir before the spraying operation, thus making the constant mixing unnecessary, but such option will not allow the user to perform fine mixture adjustments during operation as can be accomplished by the system 200.

A flowchart for a method of reducing drift in sprayed particles is shown in FIG. 3. The method includes storing a first fluid to be sprayed in a reservoir carried or otherwise associated with a vehicle at 302. As previously discussed, the vehicle may be a land, sea or air going vehicle such as a crop duster, and the first fluid may be an agricultural-related substance such as a pesticide, fertilizer and the like. A metered flow of the first fluid is provided to a spray nozzle at 304, from where it is injected into the atmosphere in the form of droplets at 306. To reduce a drift of the droplets in the wind, and to ensure that the droplets drop down into a field as intended, the droplets are caused to absorb moisture from the atmosphere at 308, which sufficiently increases their mass at 310 and thus shortens their fall time. The moisture absorption can be accomplished in any suitable way including cooling the fluid below a dew temperature or, alternatively, mixing the fluid with a hydrophilic or endothermic reactionary substance such as a second fluid in metered or desired amounts.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A spray system associated with a vehicle configured to traverse a field, the spray system comprising:
    a reservoir adapted to contain therein a fluid to be sprayed;
    a pump associated with the reservoir and configured to selectively draw a flow of the fluid from the reservoir;
    a metering device disposed to control an amount of the flow of fluid;
    at least one spray nozzle disposed to receive the amount of the flow of the fluid;
    a heat exchanger disposed to alter a temperature of the amount of the flow of the fluid that is provided to the at least one spray nozzle;
    a spray controller associated with the metering device and the at least one spray nozzle;
    a refrigeration unit associated with the heat exchanger and responsive to a control signal from the spray controller,
    a temperature sensor disposed to measure a spray temperature of the amount of the flow of the fluid provided to the at least one spray nozzle and provide a spray temperature signal to the spray controller;
    an ambient temperature sensor disposed to measure an ambient temperature and provide to the spray controller an ambient temperature signal that is indicative of the ambient temperature;
    wherein the spray temperature is calculated in the spray controller based on the ambient temperature and a mass flow of the flow of fluid to be at most equal to a dew temperature;
    wherein the spray controller operates to provide the control signal to the refrigeration unit based on a desired amount of the flow of fluid that is provided to the at least one spray nozzle and based on a desired temperature of the flow of fluid, which desired temperature will provide the spray droplets that are at the spray temperature; and
    wherein the heat exchanger operates to cool the flow of the fluid such that spray droplets of the fluid injected through the at least one spray nozzle into an atmosphere have a spray temperature at least temporarily after injection that is below a dew temperature of the atmosphere into which the spray droplets are injected.

2. The spray system of claim 1, further comprising providing a flow signal to the metering device from the spray controller based on the desired amount of the flow of fluid.

3. The spray system of claim 1, wherein the desired temperature in the spray controller is based on a dew temperature, which is provided by a user.

4. The spray system of claim 1, wherein the desired temperature is lower than a dew temperature, which is provided to the spray controller.

5. The spray system of claim 1, wherein spray controller continuously monitors the spray temperature signal as feedback, compares the spray temperature signal to the desired temperature, and adjusts operation of at least one of the metering device and the heat exchanger in response to said comparison.

* * * * *